(12) United States Patent
Bauer

(10) Patent No.: US 12,071,079 B2
(45) Date of Patent: Aug. 27, 2024

(54) CLIP FOR ATTACHING A COVERING

(71) Applicant: Bayerische Motoren Werke Aktiengesellschaft, Munich (DE)

(72) Inventor: Hermann Bauer, Wolnzach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 42 days.

(21) Appl. No.: 17/925,433

(22) PCT Filed: Apr. 28, 2021

(86) PCT No.: PCT/EP2021/061115
§ 371 (c)(1),
(2) Date: Nov. 15, 2022

(87) PCT Pub. No.: WO2021/233655
PCT Pub. Date: Nov. 25, 2021

(65) Prior Publication Data
US 2023/0192009 A1    Jun. 22, 2023

(30) Foreign Application Priority Data

May 18, 2020 (DE) ...................... 10 2020 113 385.5

(51) Int. Cl.
*B60R 13/02* (2006.01)
*F16B 2/22* (2006.01)

(52) U.S. Cl.
CPC ................ *B60R 13/02* (2013.01); *F16B 2/22* (2013.01)

(58) Field of Classification Search
CPC ...... Y10T 24/309; Y10T 24/4578; F16B 2/02; F16B 21/086; F16B 21/02; F16B 21/04; F16B 5/10; F16B 2005/0671
See application file for complete search history.

(56) References Cited

U.S. PATENT DOCUMENTS 3,486,205 A * 12/1969 Smith ....................... F16B 5/10
411/549
3,816,883 A * 6/1974 Dzus, Sr. .................. F16B 5/10
411/349

(Continued)

FOREIGN PATENT DOCUMENTS

DE    299 20 497 U1    3/2000
DE    603 01 994 T2    4/2006

(Continued)

OTHER PUBLICATIONS

International Search Report (PCT/ISA/210) issued in PCT Application No. PCT/EP2021/061115 dated Jul. 23, 2021 with English translation (five (5) pages).

(Continued)

*Primary Examiner* — Robert Sandy
(74) *Attorney, Agent, or Firm* — Crowell & Moring LLP

(57) ABSTRACT

A clip for attaching a covering is designed to be introduced in an installation direction into a passage opening, provided for this purpose, of a vehicle component. The clip has a fastening portion which is designed to position and fix the clip at the passage opening when the clip is introduced in the installation direction into the passage opening. The fastening portion has a contact region which is designed to contact an edge of the passage opening. The clip has a coupling portion which is designed to receive an end portion of a pin and to secure the pin against pulling out, and a resilient portion which has at least one resilient element which connects the fastening portion and the coupling portion to each other.

12 Claims, 3 Drawing Sheets

(56) References Cited

U.S. PATENT DOCUMENTS

| | | |
|---|---|---|
| 4,308,646 A | 1/1982 | Schenk |
| 4,952,106 A | 8/1990 | Kubogochi et al. |
| 6,409,446 B1 | 6/2002 | Schwarz |
| 7,207,759 B2 | 4/2007 | Kato |
| 2001/0022923 A1 | 9/2001 | Arisaka |
| 2003/0194288 A1 | 10/2003 | Moerke et al. |
| 2004/0020016 A1 | 2/2004 | Yoneoka |
| 2008/0298925 A1 | 12/2008 | Shinozaki |

FOREIGN PATENT DOCUMENTS

| | | |
|---|---|---|
| DE | 20 2012 002 687 U1 | 8/2013 |
| EP | 1 134 432 A2 | 9/2001 |
| JP | 2009-8249 A | 1/2009 |

OTHER PUBLICATIONS

German-language Written Opinion (PCT/ISA/237) issued in PCT Application No. PCT/EP2021/061115 dated Jul. 23, 2021 (six (6) pages).

German-language Office Action issued in German Application No. 10 2020 113 385.5 dated Feb. 11, 2021 (six (6) pages).

\* cited by examiner

CLIP FOR ATTACHING A COVERING

BACKGROUND AND SUMMARY

The invention relates to a clip for attaching a covering.

In order to attach a covering, in particular a covering in an interior of a vehicle, to a vehicle component, such as, for example, a carrier pipe of a body, clips are typically introduced in through-openings of the vehicle component. These clips form a receiving member for associated pins, by which the connection can be assembled. Thus, the covering is typically fixed between a head of the pin and the vehicle component, wherein an end piece of the pin is retained in the clip. So that the covering is held in a stable manner by the pin, it is necessary for a specific tension to be applied to the pin. This further prevents the pin from being able to be released from the clip. Therefore, such clips typically have a resilient portion, by which the tension is applied to the pin when it has been fixed in the clip.

In this case, nowadays it is usual for the clip to be mounted from the rear on the vehicle component. That is to say that the clip is introduced from one side, at which subsequently no covering is arranged, into the through-opening of the vehicle component. Thus, the clip must initially be introduced, for example, into a carrier pipe of a vehicle body and then locked in the carrier pipe in an outward direction. However, this is complex because the clip has to be guided to its subsequent assembly position by means of a tool, for example, a set of pincers. During such a time-consuming assembly operation, however, damage may be caused to the clip by the associated tool. Since such a clip further has to be deformed so that it readily locks to the vehicle body in order to allow assembly from the interior of a carrier pipe, the associated locking members have to be sized with small support faces, whereby it may be the case that the clip is pressed out of its fixing in the through-opening of the vehicle components during the introduction of the pin. This can lead to unnecessarily high subsequent working times during the assembly of vehicle components.

Consequently, an object of the invention is to provide a clip for attaching a covering to a vehicle component which ensures solid retention of the covering and which is at the same time easy to assemble.

A clip according to the invention for attaching a covering comprises a securing portion, a coupling portion and a resilient portion. The clip is configured to be introduced in an assembly direction into a through-opening provided therefor of a vehicle component. The securing portion is configured to position and to fix the clip in the through-opening when the clip is introduced in the assembly direction into the through-opening, wherein the securing portion has a contact region which is configured to abut an edge of the through-opening. The coupling portion is configured to receive an end portion of a pin and to secure the pin against being pulled out. The resilient portion comprises at least one resilient element which connects the securing portion and the coupling portion to each other. The coupling portion and the resilient portion have such dimensions that they can be moved in the assembly direction through the through-opening provided for the clip.

Consequently, the clip is a counter-piece with respect to a pin which can be fitted into the clip and fixed therein. In this case, the clip produces a connection to the vehicle component because it can be fixed thereto by means of the securing portion. A connection between the vehicle component and the covering is produced by means of the pin. The clip is introduced in an assembly direction into the through-opening provided therefor of the vehicle component. In this case, the assembly direction is a direction in which the clip is introduced into the through-opening in order to secure it to the vehicle component. In this case, the vehicle component is preferably a portion of a carrier structure of a vehicle component. In this case, the covering is preferably a trim element, in particular a foot well trim. The clip is preferably a one-piece structural element which has been produced, for example, by means of an injection-molding method. The securing portion, the coupling portion and the resilient portion are consequently preferably formed in one piece.

The securing portion is configured to position and fix the clip in the through-opening. Fixing means in this instance that the securing portion is in contact with the vehicle component in such a manner that the clip is secured at least against being pulled out of the through-opening. By the clip being positioned in the through-opening, the clip is moved into a specific, predefined position inside the through-opening. The clip and in particular the securing portion of the clip is formed in such a manner that the clip can be positioned in the through-opening only in one possible manner after it has been introduced into the through-opening. Preferably, the clip can be introduced into the through-opening in different manners, for example, in a state rotated about the assembly direction, and then positioned and fixed, for example, by the clip being constructed symmetrically. If the clip is secured to the vehicle component with one of the possible orientations, however, it is positioned in the same manner with respect to the vehicle component. It is thereby possible for in particular a positioning of a pin which is associated with the clip also to be achieved with respect to a vehicle component according to a specification, whereby a positioning of the covering with respect to the vehicle component according to a desired specification is also achieved.

The securing portion is inter alia positioned in that it has a contact region which is configured to abut an edge of the through-opening. In this case, the edge is a circumferential face in the through-opening which connects different opposing sides of the vehicle component to each other. In that the contact region of the securing portion is in contact with the edge of the through-opening, it can no longer be displaced in a direction, with respect to the vehicle component, which is perpendicular to the assembly direction. Preferably, the contact region completely abuts the complete edge of the through-opening. Alternatively, however, the contact region can also be interrupted and can abut the edge of the through-opening only over a specific portion. In this case, however, it is advantageous for the contact region to be formed so that the clip continues to remain positioned in the through-opening even if a force which is directed perpendicularly to the assembly direction is applied to the clip.

The coupling portion is configured to receive an end portion of the pin and to secure the pin against being pulled out. In this case, pulling out is a movement counter to the assembly direction. Consequently, a connection which is preferably a releasable connection is produced between the pin and the clip in the coupling portion. Preferably, the pin is secured by the pin being rotated in the coupling portion.

The resilient portion has at least one resilient element which connects the securing portion and the coupling portion to each other. The resilient element is preferably configured in such a manner that it is brought into resilient tension when the pin is secured in the coupling portion. When the clip is in an assembled state, consequently, a tensile force is applied by the resilient portion to the pin and pulls a head of the pin in the direction of the clip and in the direction of the vehicle component. Consequently, the pin is pulled in the assembly direction by the resilient portion into the clip. Therefore, this is advantageous because consequently a force is applied to the pin, which force prevents movement of the pin with respect to the clip and consequently prevents undesirable release of the pin from the clip, in particular out of the coupling portion of the clip. Furthermore, the covering which is arranged between the head of the pin and the clip, is thereby pulled in the direction of the clip and consequently in the direction of the vehicle component. Consequently, the covering is also fixed with respect to the vehicle component. In this case, the fixing of the covering with respect to the vehicle component is carried out in particular in the assembly direction or counter to the assembly direction. This means that the covering cannot be lifted off the vehicle component. A displacement of the covering with respect to the vehicle component along a surface of the vehicle component, that is to say, perpendicularly to the assembly direction, is preferably prevented in that a through-opening, through which the pin is guided by the trim, has an internal diameter which corresponds to an external diameter of a central portion of the pin.

The coupling portion and the resilient portion have such dimensions that they can be moved in the assembly direction through the through-opening provided for the clip. It can be seen from a configuration of the securing portion how an associated through-opening of a vehicle component has to be formed. Thus, the contact region of the securing portion is an indicator for how the associated through-opening is formed because the contact region substantially abuts the edge of the through-opening in order to position the clip in the through-opening. In other words, in a plane which is perpendicular to the assembly direction, the contact region has a circumference which is greater than a circumference of the coupling portion and/or of the resilient portion if they are viewed in the same plane. In other words, this means that the coupling portion and the resilient portion have smaller dimensions than the securing portion when viewed in the assembly direction so that the coupling portion and the resilient portion fit through the through-opening during assembly and only the securing portion has components which allow the clip to be secured in the through-opening.

The securing portion has a central through-opening which is formed in such a manner that the pin can be introduced into the clip through the securing portion and can be guided as far as the resilient portion.

Consequently, there is provided a clip which can be assembled from the front during assembly, that is to say, can be inserted for assembly into the through-opening of the vehicle component from a side at which the covering is also intended to be arranged. This is also the side from which the associated pin can be introduced into the clip. Consequently, it is not necessary to have access to the side of the vehicle component at which the covering is not intended to be arranged. The clip can so to speak be inserted into the vehicle component in a blind manner.

It is advantageous for the securing portion and in particular also the resilient portion to form a gap, the depth of which extends in the intended assembly direction and which allows a compression of the securing portion which allows the securing portion to be introduced into the through-opening. Thus, the securing portion particularly has components which secure the clip in the through-opening and which engage to this end behind the vehicle component when the clip is introduced in the assembly direction into the through-opening. So that these portions of the securing portion fit through the through-opening without themselves becoming deformed, it is advantageous for the securing portion to be compressible. In this case, the securing portion preferably has two portions which are separated from each other by the gap. A compression of the securing portion is intended to mean that the two portions can be moved toward each other in a plane which is perpendicular to the assembly direction. In this case, a width of the gap is reduced during the compression. After the compression, the clip springs into its original form. Thus, it is advantageous for the clip to be pressed together during assembly in order to achieve the compression of the securing portion. If the clip is in the intended position, the compression is cancelled, whereby the securing portion is fixed in the through-opening.

It is further advantageous for the securing portion to comprise at least one locking projection which is configured to act counter to removal of the clip from the through-opening. Consequently, the locking projection is suitable for fixing the clip in the through-opening. If the clip has the gap in the securing portion and/or the resilient portion, it is advantageous for the gap to be configured in such a manner that compression of the clip is possible to such an extent that the locking projection can slide through the through-opening when the clip is mounted in the assembly direction. Furthermore, the gap and/or the securing portion is/are formed in such a manner that the locking projection engages behind the vehicle component when the compression of the securing portion is cancelled.

It is also advantageous for the securing portion to be configured to abut via the contact region against a plurality of different sides of the through-opening in order to position the clip in the through-opening along axes which are perpendicular to the assembly direction. This means that the contact region abuts an inner circumference of the through-opening in such a manner that the clip is positioned in the through-opening at a specific location. The axes which are perpendicular to the assembly direction are preferably perpendicular to each other in this case. This means that the different sides are preferably two sides which are not exclusively opposing sides in order to achieve positioning of the clip and to prevent the clip from sliding.

In this case, the locking projection preferably has an inclined approach member which compresses the securing portion when the clip is introduced into the vehicle component in the assembly direction. It thereby becomes possible for no special tool to be required in order to compress the clip during assembly.

In a further preferable manner, the securing portion has a stop face which has such dimensions that it cannot be moved through the through-opening in the assembly direction during assembly of the clip and is preferably configured to fix the vehicle component between the stop face and the locking projection. Consequently, the stop face is a face which is positioned on the vehicle component after the clip is assembled. Consequently, the stop face is a face which prevents the clip from being pressed through the through-opening when the clip is assembled. After the clip is assembled, the vehicle component is consequently received between the stop face and the locking projection. Since the stop face does not have to be moved through the through-opening in order to assemble the clip, it can be configured to be particularly extensive, whereby the clip has a high level of robustness during assembly.

It is further advantageous for the securing portion to have at least one approach face which is configured to guide the clip when the clip is introduced into the through-opening in the assembly direction the contact region of the securing portion at the edge of the through-opening. Therefore, the approach face is suitable for orientating the clip during assembly in the through-opening. Consequently, the approach face is an incline which extends from a portion of the clip located further outward in the assembly direction toward a central vertical axis of the clip. If the clip strikes a surface of the vehicle component when the clip is introduced into the through-opening with the approach face, the clip is pressed in a direction which positions the clip in the through-opening. This means that the clip is pressed during assembly in the direction of the through-opening by the approach face. Preferably, the clip has two approach faces which are arranged at opposite sides of the securing portion. The locking projection may form an additional approach face. Consequently, assembly of the clip is made easier since it positions itself automatically in the through-opening when it is introduced in the assembly direction into the through-opening.

It is further advantageous for the coupling portion to comprise a receiving member of a quarter turn cap and/or the resilient portion to comprise at least one arcuate resilient element. The quarter turn cap has the advantage that the coupling portion is pulled in the direction of the securing portion by the quarter turn necessary for the closure and consequently the resilient portion or the resilient element is compressed and placed under tension. The pin is thereby secured against falling out and the trim is pulled in the direction of the vehicle component. In a further preferable manner, the resilient portion comprises precisely two arcuate resilient elements, wherein each of the curves adjoins the coupling portion at one side and the securing portion at the other side.

A securing apparatus which comprises the clip according to the invention and the associated pin which is configured to be secured in the coupling portion with an end portion of the pin is also advantageous.

In this case, it is advantageous for the pin to be formed in such a manner that it has, in a central portion of the pin in abutment with the end portion, a thickness which prevents compression of the securing portion perpendicularly to the assembly direction when the pin is introduced into the clip.

The pin particularly has at the end portion two wings which engage in the quarter turn cap of the coupling portion. Furthermore, the central portion of the pin preferably has a thickness, at which an external diameter of the central portion of the pin has an internal diameter of the central through-opening of the securing portion, through which the pin is introduced into the clip. Consequently, there is provided a clip which can be compressed during assembly in order to introduce the clip into the through-opening without being destroyed and which can no longer be compressed when the pin is introduced into the clip, whereby the clip is effectively secured against falling out in an undesirable manner.

A vehicle component which comprises the clip according to the invention or the securing apparatus according to the invention is also advantageous, wherein the vehicle component has the through-opening, in which the clip is arranged, wherein the contact region of the securing portion abuts the edge of the through-opening. Consequently, the vehicle component has the through-opening which is provided for assembling the clip. The through-opening is preferably a substantially square opening. In this case, the corners of the square through-opening can form a rounded portion.

An associated method for attaching a covering to a vehicle component is also advantageous. Such a method comprises assembling the clip according to the invention by introducing the clip into the through-opening of the vehicle component, wherein the assembly is brought about by introducing the clip in the assembly direction, arranging the covering on the vehicle component, wherein an assembly opening of the covering is arranged over the clip, and introducing the pin into the clip through the assembly opening in order to fix the covering between the clip and a head of the clip, wherein the pin is introduced in the assembly direction into the clip. Consequently, the clip and the pin are introduced from the same direction into the through-opening. Consequently, complete assembly of the clip and the associated vehicle trim is possible from only one side of the vehicle component.

Additional details, features and advantages of the invention will be appreciated from the following description and the figures.

DETAILED DESCRIPTION OF THE DRAWINGS

Figure 1A:
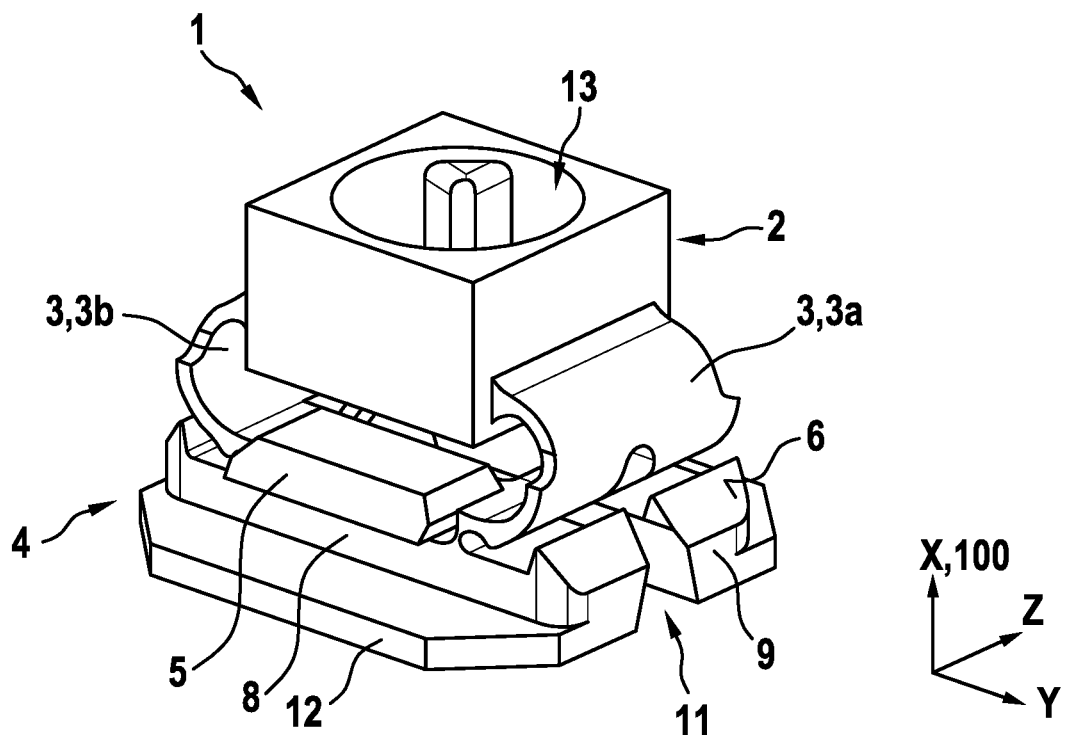
FIGS. 1a to 1c are different views of a clip according to the invention in an exemplary embodiment.
Figure 1B:
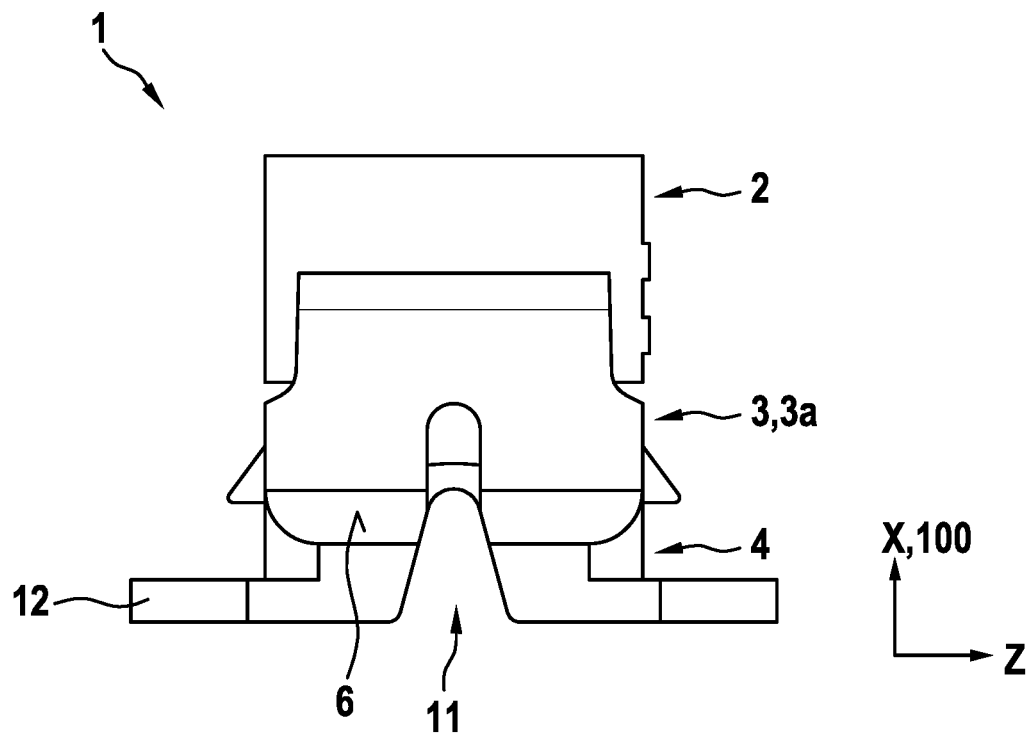
Figure 1C:
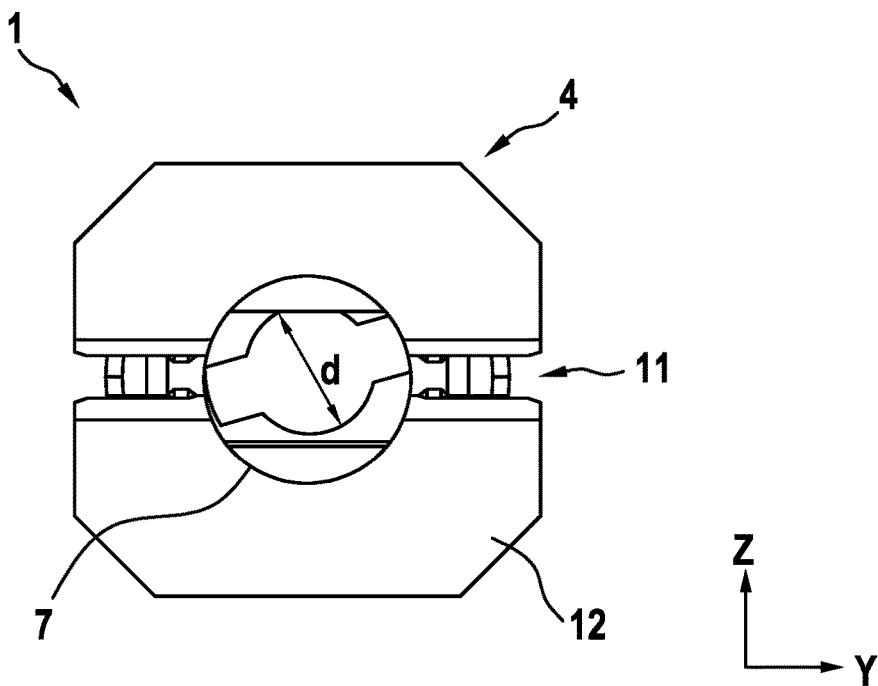

FIGS. 1a, 1b and 1c show a clip 1 according to an embodiment of the invention in different views. The clip 1 is a one-piece structural element. The clip 1 is configured to be introduced into a through-opening 20 which is provided therefor of a vehicle component 21 in an assembly direction 100 which here is an X direction. To this end, the clip 1 can be pressed into the provided through-opening 20 during assembly by hand in the assembly direction 100 and locks in the through-opening 20 when the clip 1 has reached an end position.

The clip 1 is subdivided into different regions or portions which perform different functions. Thus, the clip 1 comprises a securing portion 4, a coupling portion 2 and a resilient portion 3.

The securing portion 4 is configured to position the clip 1 in the through-opening 20 and to fix it when the clip 1 is introduced in the assembly direction 100 into the through-opening 20 which is provided in a vehicle component 21 for assembling the clip 1. In this embodiment, the securing portion 4 has a stop face 12, a locking projection 5, a contact region 8, 9 and a plurality of approach faces 6. In this case, the securing portion 4 is divided into two portions by a gap 11.

Figure 2:
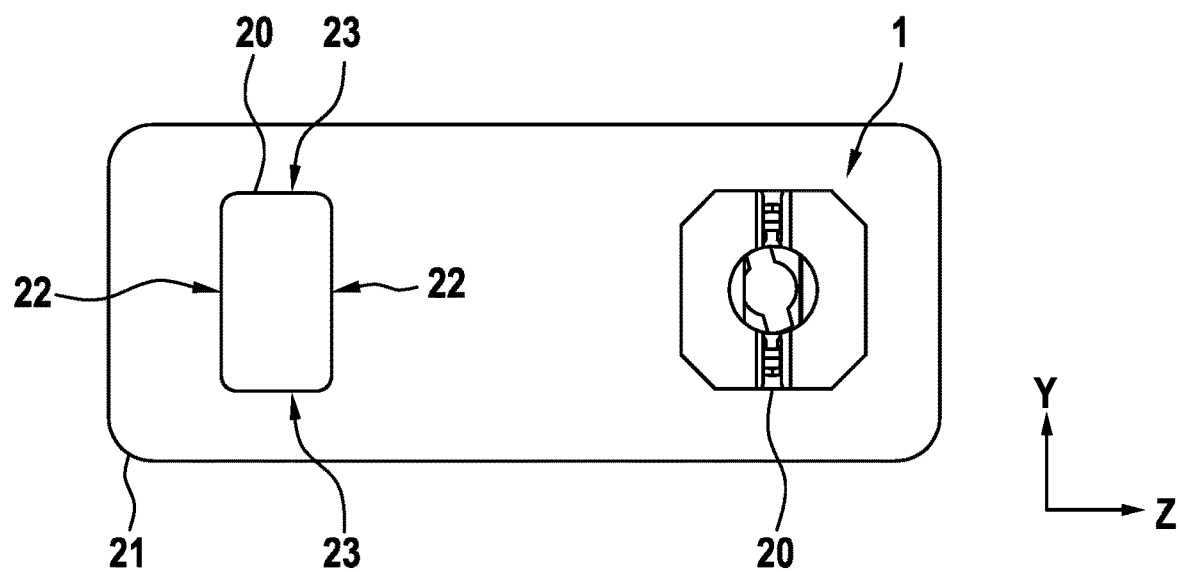
FIG. 2 shows an exemplary vehicle component with a through-opening which is provided for assembling the clip.

The clip 1 is configured to be mounted in an associated provided through-opening 20. Such a through-opening 20 is illustrated in FIG. 2, wherein the through-opening 20 is introduced in an exemplary vehicle component 21. The vehicle component 21 is illustrated in a merely simplified manner in FIG. 2 and is typically a carrier structure, in particular a carrier pipe, of a vehicle. The clip 1 has a plurality of side faces which extend around the clip 1 in the securing portion 4. Thus, the clip 1 has two mutually opposite first sides 8 which each abut one of two opposite first sides 22 of the through-opening 20 when the clip 1 is introduced in this through-opening 20. Furthermore, the clip 1 has a plurality of second side faces 9 which abut two mutually opposite second sides 23 of the through-opening 20 when the clip 1 is introduced in this through-opening 20. Since the through-opening 20 in this embodiment is substantially a rectangular shape, the first and second sides 8, 9 of the clip 1 are located so that they produce in the securing portion 4 substantially a region with a square cross section, wherein the contact region 8 extends around the clip in the vertical axis thereof which is directed along the X axis and consequently around the assembly direction. Since the contact region 8, 9 is formed in such a manner that the outer circumference thereof corresponds to an inner circumference of the associated through-opening 20, the contact region 8, 9 is configured to abut the edge of the through-opening 20 when the clip 1 is introduced into the through-opening 20.

The stop face 12 of the clip 1 delimits the contact region 8, 9 of the clip 1 at one side which comes into contact last with the vehicle component 21 when the clip 1 is introduced in the assembly direction 100. Since the assembly direction 100 is directed in FIG. 1 in an upward direction, the stop face 12 is consequently under the contact region 8, 9. The stop face 12 has such dimensions that it cannot be moved through the through-opening 20 in the assembly direction when the clip 1 is assembled. This can be seen on the right in FIG. 2. The stop face 12 has an external circumference which is greater than an internal circumference of the through-opening 20. Consequently, the stop face 12 comes to rest on a surface of the vehicle component 21 when the clip 1 is introduced into the through-opening 20. If the clip 1 is introduced into the through-opening 20, the vehicle component 21 is fixed between the stop face 12 and the locking projection 5. In the embodiment described here, the clip 1 has two locking projections 5 which directly adjoin the first sides 8 of the contact region 8, 9 in the assembly direction, that is to say, are located in FIG. 1 above the contact region 8, 9.

It is evident that the locking projections 5 project beyond the contact region 8, 9, whereby the vehicle component 21 can be received between the locking projection 5 and the stop face 12. The contact region 8, 9 therefore preferably has a height in the X direction which corresponds to a thickness of the vehicle component 21, in which the clip 1 is intended to be mounted. Since the locking projections 5 extend over the circumference of the contact region 8, 9, the clip 1 could be pressed into the through-opening 20 only with increased expenditure of force. In order to make this easier, the gap 11 is arranged in the securing portion 4 and the resilient portion 3. The securing portion 4 and the resilient portion 3 consequently form the gap 11, wherein the gap extends in terms of the depth thereof in the intended assembly direction 100, in this case the X direction. The gap 11 extends through the clip 1 in a Y direction. It is thereby possible for the securing portion 4 to be able to be pressed together in a Z direction, that is to say, compressed. Consequently, the gap 11 allows a compression of the securing portion 4. It thereby becomes possible or at least easier to introduce the securing portion 4 into the through-opening 20. If the clip 1 is compressed along the Z axis thereof, the locking projections 5 are displaced to an interior of the clip, that is to say, in the direction of the gap 11, whereby the locking projections 5 can be guided by the through-opening 20. In this case, the clip 1 can be compressed either by an associated tool or be pressed by hand into the through-opening 20. In one embodiment, this is facilitated in that the locking projections 5 each have an inclined approach member, by which the securing portion 4 is compressed when the locking projections 5 are pressed against an edge of the through-opening 20.

If the clip 1 is introduced into the through-opening 20, the securing portion 4 is not further compressed and the locking projections 5 come to rest in the assembly direction behind the vehicle component 21. Since the locking projections 5 in the assembled position do not have an approach face on a side facing the vehicle component 21, the clip 1 is secured against being pulled out. Consequently, removal of the clip 1 from the through-opening 20 is combatted.

Furthermore, the securing portion 4 has an approach face 6, in the embodiment shown four approach faces 6 which are configured to guide the clip 1 when the clip 1 is introduced into the through-opening 20 in the assembly direction 100 the contact region 8, 9 of the securing portion on the edge of the through-opening. This means that, as a result of the approach faces 6, the clip 1 is orientated toward the through-opening 20. This effect is further supported by the locking projections 5 at least in a first phase of the clip 1 being introduced into the through-opening 20. In this case, the approach faces 6 position the clip 1 in a Y direction and the locking projection 5 positions the clip 1 in a Z direction. Since the clip 1 fits into the through-opening 20 in a precisely fitting manner with the contact region 8, 9, consequently, it becomes easier to assemble the clip 1. The approach faces 6 are in this case faces which taper the contact region 8, 9 at the second side 9 in the circumference thereof in the assembly direction 100. The approach faces 6 are consequently located parallel with the Z axis and have an angle in the XY plane. Accordingly, the locking projections 5 are parallel with the Y axis and have an angle in the XZ plane.

The securing portion 4 is configured to abut a plurality of different sides of the through-opening 20 with the contact region 8, 9 in order to position the clip 1 in the through-opening along axes which are perpendicular to the assembly direction 100. The axes which are perpendicular to the assembly direction 100 are the Y axis and the Z axis in the depiction shown in FIG. 1. Since the clip 1 abuts the first sides 22 of the vehicle component 21 during assembly in the vehicle component 21 in the Z axis, the clip is positioned and fixed in the Z direction. In that the clip 1 abuts the second sides 23 of the through-opening 20 with the contact region 8, 9 in the Y axis, the clip 1 is positioned and fixed in the through-opening 20 in the Y direction. In that the vehicle component 21 is received in a precisely fitting manner between the locking projection 5 and the stop face 12, the clip is also positioned and fixed in the through-opening 20 in the X direction.

The coupling portion 2 is connected to the securing portion 4 by the resilient portion 3. The resilient portion 3 has in this case a first resilient element 3a and a second resilient element 3b. The first resilient element 3a and the second resilient element 3b are each arcuate resilient elements. In this case, a start of the arc begins at the securing portion 4 and an end of the arc ends at the coupling portion 2. In this case, the resilient portion 3 is formed in such a manner that it allows a resilient action in the assembly direction, in this instance in the X direction.

The clip 1 is provided to receive the pin 40. In this case, in particular the coupling portion 2 is configured to receive an end portion of the pin 40 and to thereby secure the pin 40 against being pulled out. The securing portion 4 has to this end a central opening 7, through which the pin 40 can be introduced into the clip 1 and the end portion of the pin 40 can be guided through the resilient portion 3, in this instance between the first resilient element 3a and the second resilient element 3b, in order to introduce the end portion of the pin 40 into the coupling portion 2. In order to fix the end portion 41 of the pin 40, the coupling portion 2 has a receiving member 13 of a quarter turn cap. Accordingly, a pin which is associated with the clip 1 has in the end portion 41 of the pin 40 which abuts a shaft of the pin 40 two wings 44 which engage in the quarter turn cap. Such a pin 40 having two wings 44 in the end portion 41 thereof is also referred to as a dart pin. If the pin 40 is rotated through 90°, they can no longer be pulled out of the coupling portion 2 counter to the assembly direction 100. At the same time, the coupling portion 2 is pulled in the direction of the securing portion 4 by the pin 40 being rotated and the associated rotation of the wings of the pin 40, whereby the resilient portion 3 is placed under tension.

The pin 40 further has a head 43 which is connected to the end portion 41 of the pin by the central portion 42 of the pin 40.

Figure 3:
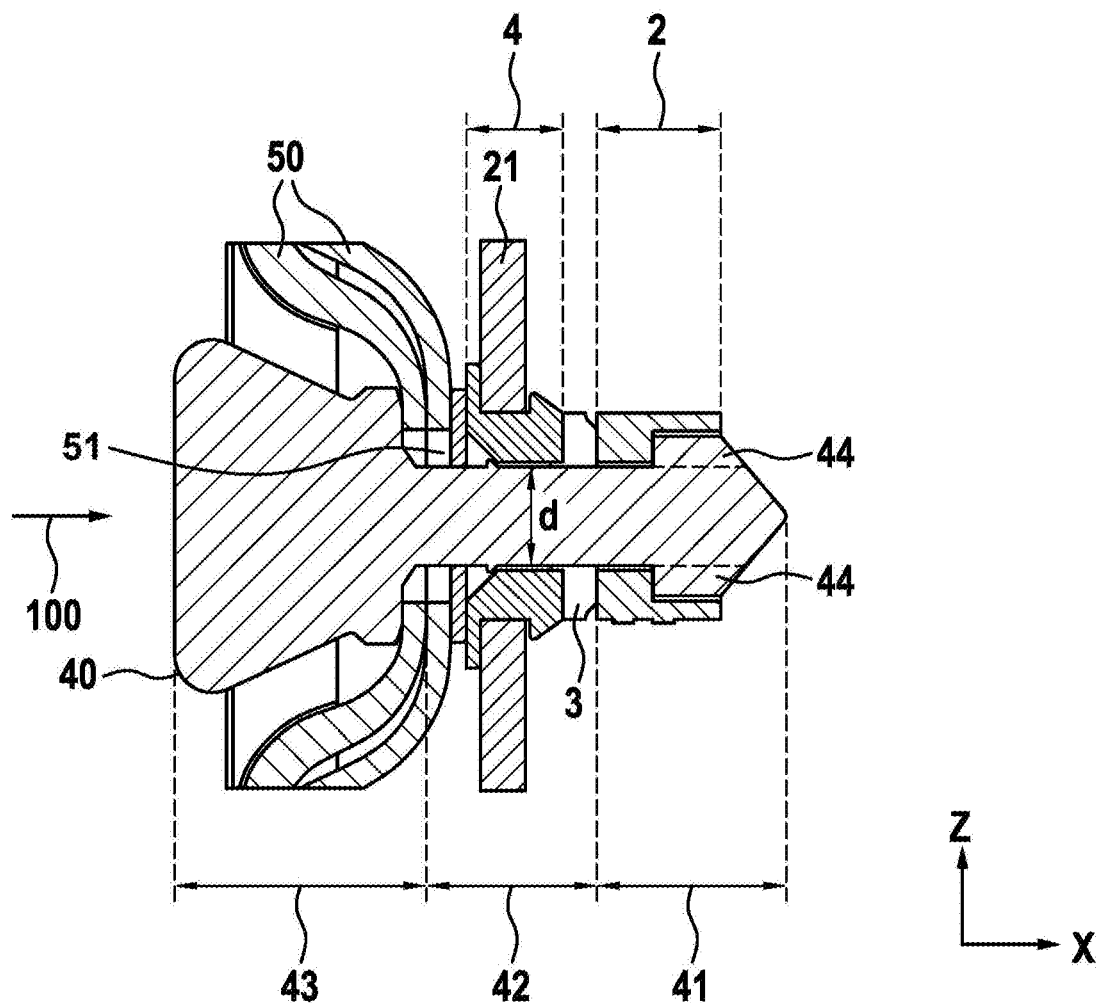
FIG. 3 shows an illustration of the clip, the pin, the covering and the vehicle component in a sectional depiction in an assembled state.

FIG. 3 shows a securing apparatus which has the above-described clip 1 and the associated pin 40. It is evident that the end portion 41 of the pin 40 is secured in the coupling portion 2. Thus, the two wings 44 of the end portion 41 of the pin 40 are rotated in the coupling portion 2 in such a manner that the pin 40 cannot be pulled out of the coupling portion 2. FIG. 3 further shows that the pin 40 has the head 43 which is not introduced into the clip 1 but instead fixes the covering 50 between the clip 1 and the head 43 of the pin 40. In this case, the covering 50 has an assembly opening 51, the internal diameter of which corresponds to an external diameter of a shaft of the pin, in this case the central portion 42 of the pin 40. The assembly opening 51 of the covering 50 can further in this case have at least one corresponding receiving member so that the wings 44 of the pin 40 can be guided through the covering 50.

The central portion 42 of the pin 40 adjoins the end portion 41 and has a thickness which prevents compression of the securing portion 4 perpendicularly to the assembly direction 100 when the pin 40 is introduced into the clip 1. Thus, the clip 1 cannot be further compressed in the Z direction when the pin 40 is introduced into the clip 1. To this end, the through-opening which is provided for the pin 40 has in the securing portion 4 in the Z direction a width which corresponds to the thickness of the central portion 42 of the pin 40. In the Y direction, this through-opening has a greater width so that the wings 44 can be moved by the securing portion 4. In that the clip 1 and in particular the securing portion 4 cannot be compressed, the locking projections 5 cannot be moved out of the vehicle component 21. Consequently, the clip 1 is secured in the vehicle component 21. The vehicle component 21, as illustrated by way of example in FIG. 2, consequently has the through-opening 20, in which the clip 1 is arranged, wherein the contact region 8, 9 of the securing portion 4 abuts an edge of the through-opening 20.

A method for attaching a covering 50 to a vehicle component 21 preferably comprises assembling the above-described clip 1 by introducing the clip 1 in the through-opening 20 of the vehicle component 21, wherein the assembly is carried out by introducing the clip 1 in the assembly direction 100. In this case, during the assembly of the clip, the clip 1 is preferably compressed in a direction which is perpendicular to the assembly direction, in this case a Z direction, and introduced in the assembly direction 100 into the through-opening 20. The compression is preferably carried out by pressing the clip 1 together by means of two approach faces of two locking projections 5. In an additional step, the covering 50 is arranged on the vehicle component 21, wherein an assembly opening 51 of the covering 50 is arranged over the clip 1. In order to secure the covering 50 on the vehicle component 21, a pin 40 is further introduced through the assembly opening 51 of the covering 50, into the clip 1, and the pin 40 is fixed in the clip 1 in order to fix the covering 50 between the clip 1 and a head 43 of the pin 40. The pin 40 is introduced into the clip 1 in the assembly direction. Furthermore, the clip is fixed in the clip 1 particularly by a quarter turn.

Consequently, it is possible to attach the covering 50 to the vehicle component 21, even if access to the vehicle component 21 exists only from one side.

Reference is made explicitly to the disclosure of FIGS. 1 to 3 in addition to the above disclosure.

LIST OF REFERENCE NUMERALS

1 Clip
2 Coupling portion
3 Resilient portion
3a First resilient element
3b Second resilient element
4 Securing portion
5 Locking projection
6 Approach face
7 Central opening
8 First sides of the contact region
9 Second sides of the contact region
11 Gap
12 Stop face
13 Receiving member
20 Through-opening
21 Vehicle component
22 First sides of the through-opening
23 Second sides of the through-opening
40 Pin
41 End portion of the pin
42 Central portion of the pin
43 Head of the pin
44 Wing of the pin
50 Covering
51 Assembly opening
100 Assembly direction

The invention claimed is:

1. A clip for attaching a covering, wherein the clip is configured to be introduced in an assembly direction into a through-opening provided therefor of a vehicle component, comprising:
   a securing portion configured to position and fix the clip in the through-opening when the clip is introduced in the assembly direction into the through-opening, wherein the securing portion has a contact region configured to abut an edge of the through-opening;
   a coupling portion configured to receive an end portion of a pin and to secure the pin against being pulled out of the clip;
   a resilient portion comprising at least one resilient element which connects the securing portion and the coupling portion to each other, wherein
   the coupling portion and the resilient portion are dimensioned so as to be movable in the assembly direction through the through-opening provided for the clip.

2. The clip according to claim 1, wherein
   the securing portion and the resilient portion form a gap, a depth of said gap extending in the assembly direction, the gap allowing a compression of the securing portion so as to allow the securing portion to be introduced into the through-opening.

3. The clip according to claim 1, wherein the securing portion comprises at least one locking projection configured to act counter to removal of the clip from the through-opening.

4. The clip according to claim 1, wherein the securing portion is configured to abut, via the contact region, against a plurality of different sides of the through-opening in order to position the clip in the through-opening along axes which are perpendicular to the assembly direction.

5. The clip according to claim 1, wherein the securing portion has a stop face dimensioned such that the stop face cannot be moved through the through-opening in the assembly direction during assembly of the clip and is configured to fix the vehicle component between the stop face and a locking projection.

6. The clip according to claim 1, wherein the securing portion has at least one approach face configured to guide the clip, when the clip is introduced into the through-opening in the assembly direction, to the contact region of the securing portion at the edge of the through-opening.

7. The clip according to claim 1, wherein the coupling portion comprises a receiving member of a quarter turn cap and/or the resilient portion comprises the at least one resilient element being at least one arcuate resilient element.

8. A securing apparatus, comprising:
a clip according to claim 1; and
an associated pin configured to be secured in the coupling portion by an end portion of the pin introduced into the clip in the assembly direction.

9. The securing apparatus according to claim 8, wherein the pin has a thickness in a central portion in abutment with the end portion which prevents compression of the securing portion perpendicularly to the assembly direction when the pin is introduced into the clip.

10. A vehicle component, comprising:
the clip according to claim 1; and
the vehicle component having the through-opening, in which the clip is arranged, wherein
the contact region of the securing portion abuts an edge of the through-opening.

11. The vehicle component according to claim 10, further comprising:
an associated pin configured to be secured in the coupling portion by an end portion of the pin introduced into the clip in the assembly direction.

12. A method for attaching a covering to a vehicle component, comprising:
mounting a clip by introducing the clip into a through-opening of a vehicle component, wherein assembly is brought about by introducing the clip in an assembly direction, the clip comprising:
(i) a securing portion configured to position and fix the clip in the through-opening when the clip is introduced in the assembly direction into the through-opening, wherein the securing portion has a contact region configured to abut an edge of the through-opening;
(ii) a coupling portion configured to receive an end portion of a pin and to secure the pin against being pulled out of the clip;
(iii) a resilient portion comprising at least one resilient element which connects the securing portion and the coupling portion to each other, wherein
the coupling portion and the resilient portion are dimensioned so as to be movable in the assembly direction through the through-opening provided for the clip;
arranging the covering on the vehicle component, wherein an assembly opening of the covering is arranged over the clip; and
introducing the pin into the clip through the assembly opening in order to fix the covering between the clip and a head of the pin, wherein the pin is introduced in the assembly direction into the clip.

* * * * *